Patented Apr. 15, 1941

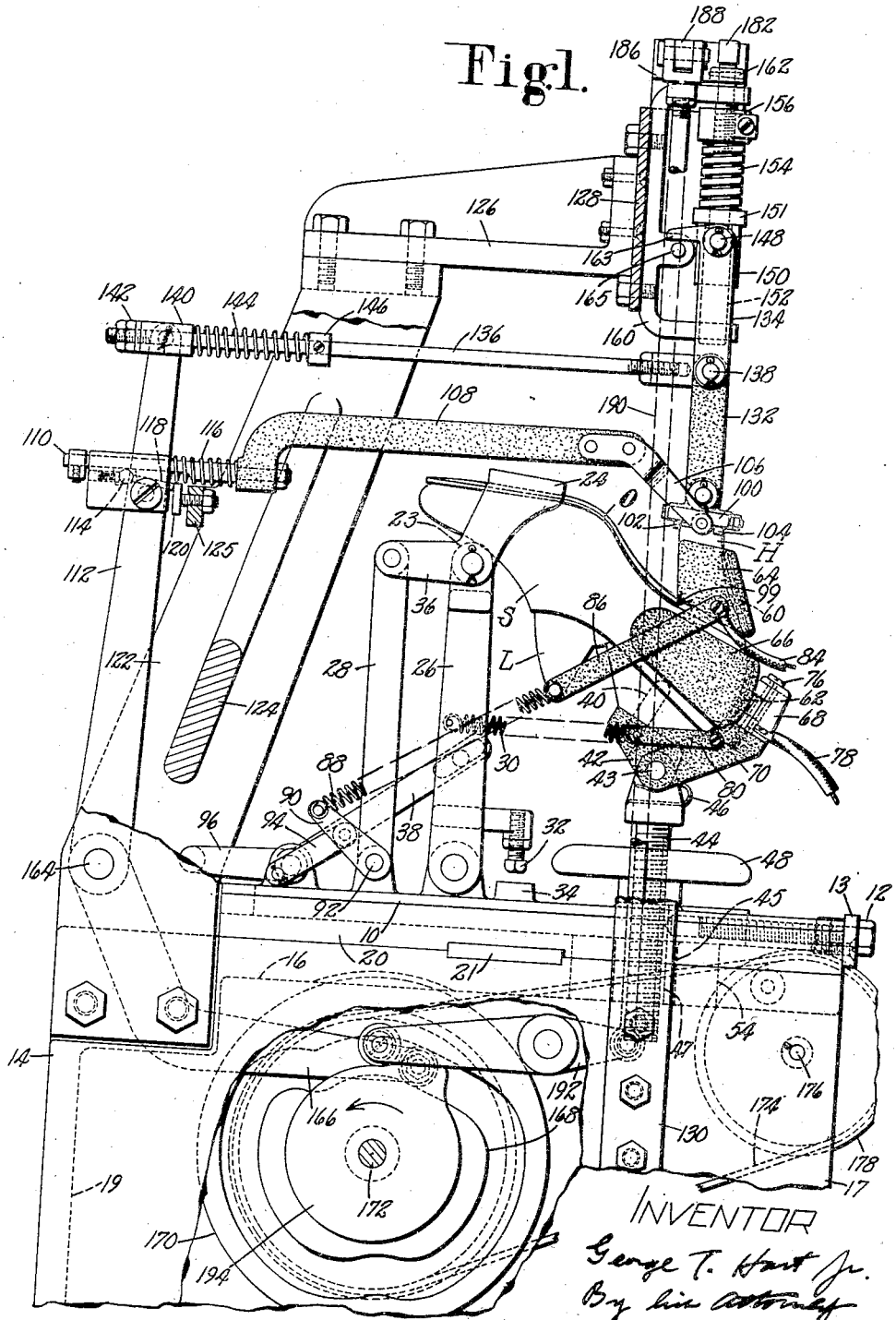

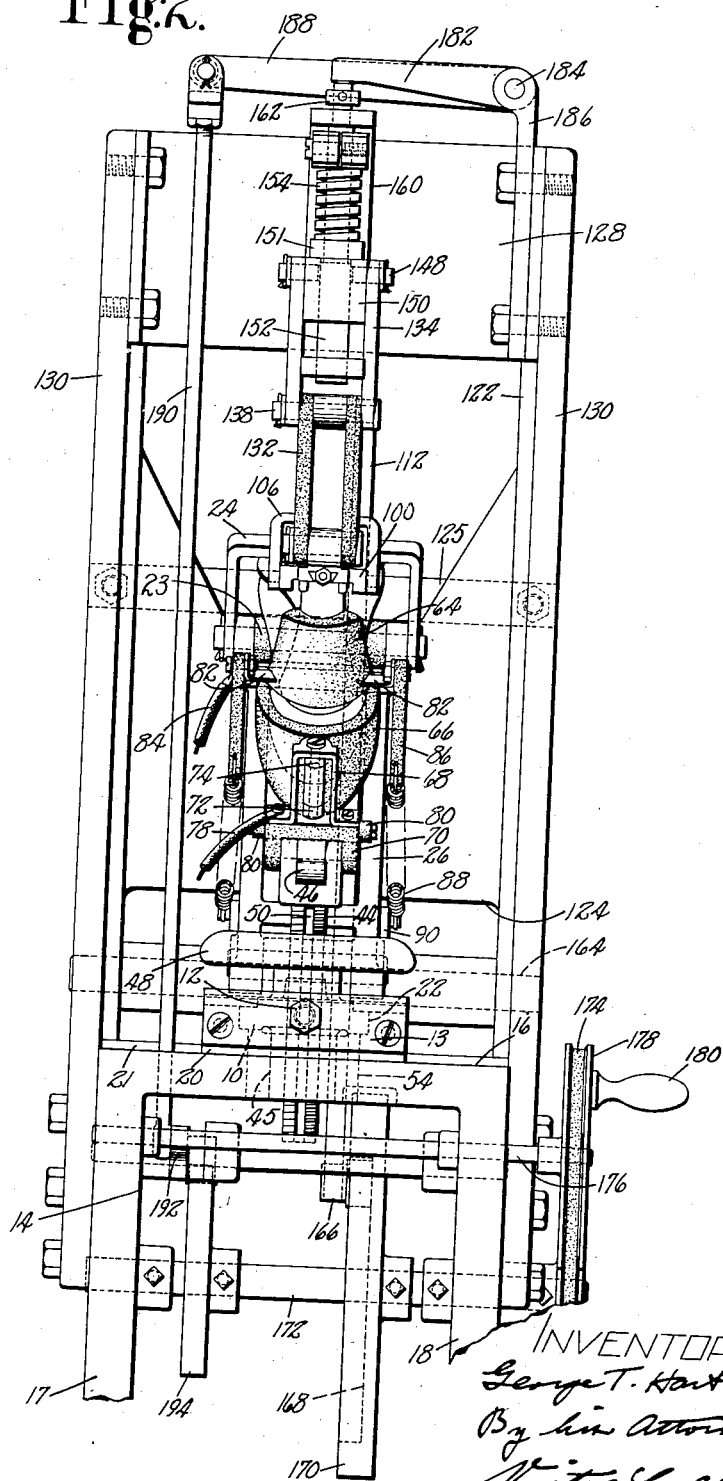

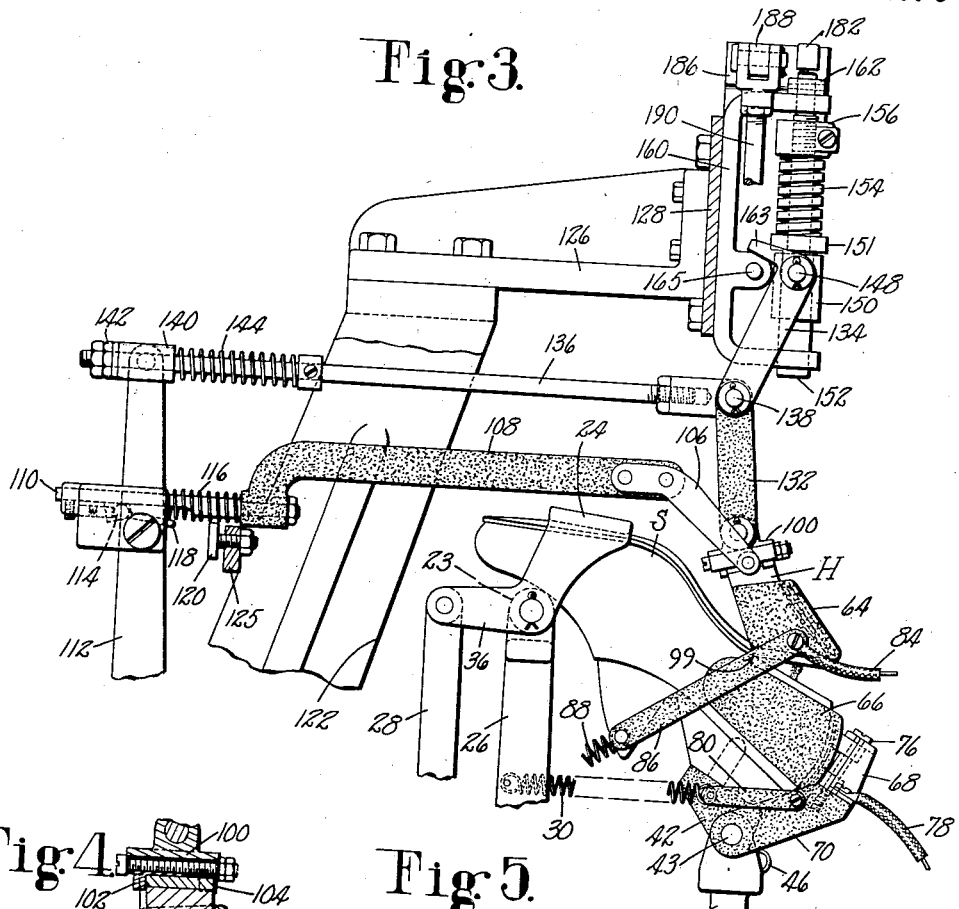

2,238,054

UNITED STATES PATENT OFFICE 2,238,054

ATTACHING HEELS BY WELDING

George T. Hart, Jr., Lynn, Mass., assignor to United Shoe Machinery Corporation, Borough of Flemington, N. J., a corporation of New Jersey Application May 23, 1940, Serial No. 336,751

17 Claims. (Cl. 12—42)

This invention relates to a device for welding metallic articles, the welding heat being produced by an arc caused by a high-frequency electrostatic field. The invention is herein illustrated as embodied in a device for attaching heels to shoes by welding metallic parts associated with said heels and shoes. This application is a continuation of my earlier application for Letters Patent of the United States, filed September 20, 1938, Serial No. 230,835, for Improvements in the art of joining parts, as to all the subject-matter which is common to both applications.

In that application, there is described and claimed a method of connecting metal parts positioned in a high-frequency electrostatic field and in which an arc is drawn between said parts as they are separated, said arc being dependent upon energy supplied wholly by the electrostatic field. After a very short interval the parts to be joined will have been heated by the arc, whereupon they are forced together to cause a fusion of the arcing points. The method is particularly adapted to the attachment of heels to shoes because of the fact that said articles may be provided with metal members which are wholly surrounded by a non-metallic medium, save at the surface of contact, and because by the utilization of an electrostatic field heat may be supplied to said members, without the necessity of conducting electricity directly to them, by separating the metallic members within the field to draw an arc.

To this end, an important object of the invention is to provide a device for supporting and moving the articles to be joined to carry them through the heating and fusing cycle.

In the utilization of such a device for the attachment of heels to shoes, it is important that the heel shall be positioned in exactly the correct location when the two parts are brought together to extinguish the arc and thereby fuse the metal parts carried by them, for obviously there can be no correction of this position once the welding has been effected.

Provision is made, in accordance with a feature of the invention, for supporting a shoe and a heel for relative movement so that the two may be separated and then brought together in exactly the desired relation, which supporting means provide for preliminary positioning of the heel upon the shoe and as much adjustment and readjustment as may be necessary prior to the development of the electrostatic field which will cause the welding action. As herein illustrated, the heel is supported above an inverted shoe for tilting movement about a shoulder on the sole at the heel breast line, and mechanism is provided for causing this tilting movement.

Still another feature of the invention will be found in mechanism for applying additional pressure to squeeze the heel against the shoe exactly at the time when the arc is extinguished and the fusing action takes place. Still other features of the invention reside in improved electrode supporting devices adapted to hold insulated U-shaped electrodes in firm engagement with the periphery of the heel and with the rear end of the shoe respectively.

These and other features of the invention will best be understood from a consideration of the specification, taken in connection with the accompanying drawings, in which Fig. 1 is a side elevation of the device, with parts broken away;

Fig. 2 is an end elevation;

Fig. 3 is a fragmentary view showing a portion of the device as viewed in Fig. 1, but with the heel tilted to draw an arc; and Figs. 4, 5, and 6 show the heel and the adjacent portion of the shoe in successive positions as the steps of attaching the heel are carried out.

The device herein illustrated is shown in a form particularly adapted for attaching heels to shoes, and there has been illustrated a woman's shoe S which is provided with a Cuban heel H. It will be understood, however, that the invention is not limited to use for welding these particular articles or for attaching this particular type of heel.

The heel is supported from above by a structure to be later described, while the shoe is supported from below upon mechanism mounted upon a slide 10 which is capable of adjustment in a direction lengthwise of the shoe by means of a screw 12 threaded in the slide and rotatable in a plate 13 attached to a block 20 on a frame 14 of the machine. The screw is held by locknuts against axial movement with respect to the plate. This frame has a top 16 and sides 17, 18, and 19, and on the top is mounted the block 20, undercut at 22 (Fig. 2) to provide a guideway for the slide 10, this guideway being closed at one end by the plate 13. A vertical alinement of the heel and shoe is permitted by a transverse spline 21 which allows the block 20 to be moved, laterally of the shoe, across the top 16 of the frame. When the shoe is presented to the device, the toe end of the shoe is positioned between a rubber-covered roll 23 and a stirrup 24 which engages the bottom of the shoe. These devices for positioning the toe end of the shoe are carried on parallel links 26 and 28 which are pivoted on the slide 10 and are drawn toward the shoe by springs 30. A stop screw 32 arranged to engage a boss 34 on the slide limits the rearward movement of the links (to the right in Fig. 1), and it will be noted that the stirrup 24 is maintained in upright position by reason of an extension 36 thereon joining the upper ends of the links 26 and 28. Forward movement of the stirrup 24 and the links is limited by a slotted link 38.

After the shoe has been pushed into the toe-positioning devices so that its tread surface is located with respect to the entire device by means of the stirrup 24, then the last on which the shoe is built is pushed onto a last pin 40 mounted in a block 42 of insulating material which is pivoted on a pin 43 at the forked upper end of a threaded post 44, the post being vertically slidable in a sleeve 45 depending from and secured to the slide 10. A U-shaped flat spring 46 holds this block 42 normally in the illustrated position ready to receive the shoe. Heightwise adjustment of the work support, as to make the position of the shoe correspond to the height of the heel which is to be employed, is obtained by rotation of a hand wheel 48 which is threaded on said post and rests on a boss on the upper surface of the slide 10. A spline 47 in the latter enters a groove 50 in the post to prevent rotation thereof. The depending sleeve 45 is received in a slot 54 in the top 16 of the frame so that a lengthwise adjustment of the slide 10 is permitted.

An electrostatic field intersecting the heel seat portion of the shoe is produced between two electrodes 60 and 62 which are metal plates constituting band clamps 64 and 66 and are covered with insulating material, such as rubber or leather, and adapted to surround the heel H and the heel seat end or counter portion of the shoe S respectively. The band clamp 66 is swingable laterally in an inverted U-shaped bracket 68 (Fig. 2) attached to the upper end of a forked arm 70 of insulating material which is pivoted on the stud 43 at the upper end of the post 44. The metal electrode portion 62 of the band clamp 66 is provided with lugs 72 and 74 (Fig. 2) which pivot on a screw 76 passing through this bracket 68 into the arm 70. A conductor 78 attached to the bracket 68 enables this electrode 62 to be connected to one side of a high-frequency circuit. As the band clamp 66 is moved into position around the counter portion of the shoe, it will automatically adjust itself to the shoe and will be pressed firmly against the shoe by the action of the springs 30 which are connected through links 80 of insulating material to the sides of the arm 70. Since the block 42 carrying the last pin 40 and the arm 70 carrying the band clamp 66 are preferably constructed of insulating material, there will be no diversion or scattering of the electrostatic field intersecting the heel seat.

The heel electrode 60 has laterally extending lugs 82 (Fig. 2) to one of which there is connected a conductor 84 for attachment to the other side of the high-frequency circuit. To these same lugs are pivoted links 86 of insulating material which are joined to springs 88 the lower ends of which are fastened to arms 90. These arms are secured to the ends of a pin 92 which serves as a pivot for the lower end of the parallel link 28, and the arms 90 are joined by other links 94 to interconnected similar cranks at the opposite sides of the slide 10, said cranks having an operating handle 96. By turning the handle 96 clockwise, as viewed in Fig. 1, the tension of the springs 88 will be considerably lessened so that the band clamp 64 may be dropped down to the frame to permit the ready positioning of the shoe, and subsequently the heel H. After the heel has been brought into position against the usual shoulder on the shoe sole at the point 99, then the band clamp may be raised into position to surround the curved periphery of the heel, and the handle 96 swung counterclockwise to increase the tension of the springs 88.

In order that the heel H may be tilted to draw an arc, as previously described, the tread end of the heel is held within a clamp 100 which is provided with a breast-engaging abutment 102 and with a screw-operated gripping member 104. This clamp 100 is pivotally supported between the arms 106 of a link 108 having a body of insulating material and a reduced end 110 which is slidable in a lever 112 and is adapted to be clamped to said lever by a Horton clutch 114. Between the main portion of the link 108 and the lever 112 there is interposed a spring 116 and, when the lever reaches a predetermined position, the clutch will be released by the engagement of a trigger rod 118 with an abutment plate 120. On the upper part of the frame 14 there is bolted an inverted U-shaped frame member 122 having a crossweb 124, and the abutment plate 120 is adjustably secured to a crossbar 125 on this frame member. Carried at the upper end of the frame member is an angle iron bracket 126 to the right end of which (Fig. 1) there is attached a plate 128 having its end portions bent for attachment to upright bars 130, the lower ends of these bars being bolted to the frame 14.

When the parts to be welded have been sufficiently heated by the arc in a manner to be more fully explained, then the heel must be pressed firmly against the shoe, as indicated in Fig. 6. To this end, a preliminary pressure is applied by means of a toggle having links 132 and 134. The links 132 are of insulating material and are pivoted on the heel clamp 100, and the toggle is adapted to be broken and later returned to straightened position by means of a rod 136 attached to the pivot 138 at the center of the toggle. This rod is slidable through a block 140 pivoted at the upper end of the cam lever 112. Sliding movement of the rod is limited in one direction by nuts 142 and, in the other direction, by a spring 144 interposed between the block 140 and a collar 146, the spring serving to permit proper operation of the toggle under various conditions. The upper ends of the upper toggle links 134 are pivoted at 148 to an abutment block 150 having limited sliding movement on the lower portion of a rod 152 against the compression of a heavy spring 154 which surrounds a reduced upper portion of the rod between a collar 151 resting on a shoulder of the rod and a collar 156 clamped on said rod. The rod 152 is vertically slidable in the upper and lower arms of a U-shaped bracket 160 which is attached to the mid-portion of the plate 128, and the rod is prevented from dropping downwardly in the bracket 160, when the toggle has been broken, by a collar 162 attached to the upper end of the rod where it projects through the bracket. After the toggle has been broken, and if there is no heel in the machine, the block 150 might drop were the link 134 not provided with a toe 163 adapted to engage a pin 165 supported on the bracket 160. This toe 163 also prevents the toggle being thrown any substantial distance beyond the position in which the links are in alinement, and the hand wheel 48 is adjusted for each height of heel to bring the toe just above the pin 165.

The straightening of the toggle to bring the heel into engagement with the shoe is effected by the lever 112 pivotally supported on a crossshaft 164, and the lever has an arm 166 provided with a cam roll which is received in a groove 168 of the cam 170. This cam is mounted on a cam shaft 172 to which movement may be imparted by means of a belt 174 extending to a countershaft 176 which is provided with a pulley 178 having a handle 180.

Experience has shown that for heel attaching it is highly desirable to press the heel against the heel seat with a very considerable force so that all portions of the periphery of the cup of the heel will closely engage the shoe upper. Accordingly, the illustrated device is provided with a lever 182 pivoted at 184 (Fig. 2) in the upper end of a plate 186 attached to the frame superstructure formed by the plate 128 and the upright bar 130. This lever rests against the upper end of the rod 152 and, when the toggle has been straightened, the lever may be depressed to transmit pressure through the rod 152, the spring 154, by way of the collar 151 and the sleeve 150 to the toggle and thence to the heel clamp 100. To this end, the lever 182 has an arm 188 to which there is secured a depending rod 190 connected at its lower end to a cam lever 192 pivoted on the frame 14. The far end of this cam lever has a roll resting on the periphery of a cam 194 also attached to the cam shaft 172.

In the use of this device to carry out the novel method described and claimed in the aforementioned application, a shoe will be positioned on the support by first engaging the toe end of the shoe with the tread plate 24 and the toe rest 23, and then pushing the shoe forward until the last may be engaged with the last pin 40. Then, or at some other convenient time, the band clamp 66 containing the electrode 62 may be tilted about the pivot 43 to bring it into engagement with the heel end of the shoe. During this movement the line of pull of the springs 30 will pass the dead center provided by said pivot and bring the band clamp into firm engagement with the shoe. The operator will then place the heel H in the clamp 100 and secure it therein and will raise the band clamp 64 to engage the rear periphery of the heel. After this, having completed the connection to the leads 78 and 84 to form the high-frequency circuit so as to set up an electrostatic field passing through the heel seat of the shoe, the pulley 178 may be turned manually or by power to cause the cams 170 and 194 to go through a complete cycle. This cycle commences by tilting the lever 112 to a position such as that indicated in Fig. 3, thereby to break the toggle and to tilt the heel to a position such as is shown in Fig. 5 to draw an arc between the metallic members M and P. The continuation of the cycle will permit the existence of the arc for a sufficient period of time to bring these metallic members to a welding heat such that, when the upper end of the cam lever 112 is swung to the right in Fig. 1 and the heel is brought down to the position indicated in Fig. 6, the metallic members will be in the condition to fuse and will hold the heel firmly to the shoe. It will be understood that the arc will be extinguished as soon as the metallic members contact. During this movement of the lever 112 the trigger 118 of the Horton clutch connection to the link 108 will be broken as soon as said trigger strikes the plate 120. This plate is adjustably supported so that soon after the Horton clutch is released the heel H will reach a point of contact with the shoe and, during further movement of the lever 112, the spring 116 will be compressed to hold the heel in this position. During this or further movement of the lever 112 the toggle will be straightened through the action of the lever on the rod 136. Immediately after the straightening of the toggle the cam 194 will cause pressure to be applied to the heel through the lever 182 and the vertical rod 152, thereby insuring a full contact of the heel with the heel seat and the upper.

In the particular arrangement shown herein, the metallic member M in the shoe is a headed stud the head portion of which lies on the inner side of the outsole O and is riveted to the insole. On the other hand, the metallic member P, which is attached to the heel by suitable fasteners such as nails, is a plate having an upstruck convex loop divided at its center. When this loop is brought back into contact with the shank portion of the stud in the metallic member M, it can yield to compensate for variations or irregularities in the distance between the two metallic members. At the same time by reason of its springiness the respective metallic members will be firmly welded together. It will be seen that this welding operation requires no conductive connection to the metallic members which are substantially surrounded by a non-metallic medium, save at the surface of contact.

It will be understood that the electrostatic field may also be utilized, as has been described in my copending application, for the purpose of fusing a connecting metal, thereby to make a soldered joint rather than a welded joint. When this is done, it is found desirable to introduce a pellet of soldering material between the metallic members after the heel has been moved into its correct position with respect to the shoe. Accordingly, the illustrated contour of the cam 170 is such that the heel is raised once to such an extent, as is indicated in Fig. 5, to permit the interpositioning of the pellet of soldering material before the electric connection has been made to produce an electrostatic field. The action of the cam then tilts the heel back to its original position (Fig. 4), thereby to make a metallic contact between the members attached to the shoe and heel respectively and completes the cycle by again tilting the heel to draw an arc and returning it into its final position. When the device is to be used for the method of attachment involving a direct welding of the parts, then the contour of the cam will preferably be slightly changed from that which has been illustrated herein so that only one tilting of the heel is necessary.

Having thus described my invention, what I claim as new and desire to secure by Letters Patent of the United States is:

1. A device for welding metallic articles which are substantially surrounded with a non-metallic solid medium save at the surface of contact, supporting means for said metallic members and the surrounding medium, and electrodes adapted to be associated with said parts outside the non-metallic medium and adapted to be connected to a source of high-frequency alternating current, thereby to set up an electrostatic field surrounding said metallic members, one of said supporting means being movable, thereby to separate said metallic members and to produce an arc.

2. A device for welding metallic articles which are substantially surrounded with a non-metallic solid medium save at the surface of contact, supporting means for said metallic members and the surrounding medium, electrodes adapted to be associated with said parts outside the non-metallic medium and adapted to be connected to a source of high-frequency alternating current, thereby to set up an electrostatic field surrounding said metallic members, and means for moving one of said supporting means and with it the associated electrode, thereby to draw an arc between said metallic members.

3. A device for welding metallic articles comprising means for producing a high-frequency electrostatic field, means for supporting the articles to be joined in this field, and means for mechanically separating said articles from a position of contact to draw an arc and then returning them to a position of contact to effect fusing and thereby to extinguish the arc.

4. A device for attaching heels to shoes comprising individual supporting means for both a heel and a shoe, electrodes associated with both the heel and the shoe and adapted to be connected to a source of high-frequency alternating current, and means for causing relative movement between said supporting means to establish an arc and to effect fusing.

5. A device for attaching heels to shoes comprising shoe-supporting means, heel-holding means cooperating therewith, electrode plates associated with the supporting and the holding means, and the terminals of a high-frequency electrical circuit joined to said plates.

6. A device for attaching heels to shoes comprising a shoe-support, shoe-positioning means associated with the support, heel-holding means cooperating with the supporting and positioning means, and electrodes joined to the terminals of a high-frequency circuit included respectively in the positioning means and in the heel-holding means.

7. A device for attaching heels to shoes comprising a jack, a heel-holder movable toward and from the jack, band-clamps embodying electrodes and associated with said jack and said holder, and the terminals of a high-frequency circuit connected to the electrodes.

8. A device for attaching heels to shoes comprising a support for a shoe, an electrode associated with the heel seat end of the shoe on said support and adapted to be connected to one side of a high-frequency circuit, a tiltably mounted heel support, an electrode associated with a heel on said support and adapted to be connected to the other side of said circuit, and means for tilting said heel support.

9. A device for attaching heels to shoes comprising a support for a shoe, an electrode associated with the heel seat end of the shoe on said support and adapted to be connected to one side of a high-frequency circuit, a tiltably mounted heel support, an electrode assocated with a heel on said heel support and adapted to be connected to the other side of said circuit, means for tilting said heel support, and means for applying pressure to said heel through said support to force the heel into firm engagement with the heel seat.

10. A device for attaching heels to shoes comprising a support for a shoe, an electrode associated with the heel seat end of a shoe on said support and adapted to be connected to one side of a high-frequency circuit, a heel support, an insulated electrode resting against a side of a heel on said support, yieldable means for causing the electrode to engage the heel, said electrode being adapted to be connected to the other side of said circuit, and means for moving said heel support to draw the heel away from the shoe and for later returning it to engagement with the shoe.

11. A device for attaching heels to shoes comprising a support for a shoe, an electrode associated with the heel seat end of the shoe on said support and adapted to be connected to one side of a high-frequency circuit, a heel support, an insulated electrode resting against a side of a heel on said support, yieldable means for causing the electrode to engage the heel, said electrode being adapted to be connected to the other side of said circuit, means for moving said heel support to draw the heel away from the shoe and for later returning it to engagement with the shoe, and means for applying pressure to the heel to force it into firm engagement with the heel seat of the shoe.

12. A device for attaching heels to shoes comprising a tiltable support associated with the heel end of a shoe, means for positioning the toe end of the shoe on the said support arranged to limit the tilting movement of said shoe, an insulated electrode surrounding the heel end of the shoe, resilient means for drawing said electrode into firm engagement with the shoe, a heel support, an insulated electrode surrounding the periphery of a heel on said support, and resilient means drawing said electrode toward the heel.

13. A device for attaching heels to shoes comprising a tiltable support associated with the heel end of a shoe, means for positioning the toe end of the shoe on the said support arranged to limit the tilting movement of said shoe, an insulated electrode surrounding the heel end of the shoe, resilient means for drawing said electrode into firm engagement with the shoe, a heel support, an insulated electrode surrounding the periphery of a heel on said support, resilient means drawing said electrode toward the heel, the direction of tension of said last-mentioned means causing said heel to engage the heel seat of the shoe.

14. A device for attaching heels to shoes comprising means to support a shoe in inverted position, a tiltable heel-clamp, a toggle connected to said heel-clamp, and cam-operated means for tilting said heel-clamp and for opening and closing said toggle.

15. A device for attaching heels to shoes comprising a pivotally supported toe support, a support for the heel end of a shoe on said support, an electrode adapted to cooperate with the heel end of the shoe, and a spring interconnecting said electrode and said pivoted toe support.

16. A device for attaching heels to shoes comprising a support for a shoe provided with a sole having a breast shoulder, a support for a heel, said heel being adapted to be positioned by engagement with said breast shoulder, an insulated electrode surrounding the outer periphery of said heel, a spring drawing said electrode toward the heel to push the latter into engagement with said shoulder, and means for increasing the tension of said spring.

17. A device for attaching heels to shoes comprising a support for a shoe, means for engaging the tread end of a heel, a pivoted link attached to said heel-engaging means, pressure-applying means, the upper end of said link being adjacent to said applying means, and cam-operated means for swinging said link to tilt said heel with respect to the shoe constructed and arranged to return said heel into engagement with the shoe and to bring said link into alinement with said pressure-applying means.

GEORGE T. HART, Jr.